United States Patent  (10) Patent No.: US 7,639,047 B1
Ang et al.  (45) Date of Patent: Dec. 29, 2009

(54) TECHNIQUES FOR REDUCING CLOCK SKEW IN CLOCK ROUTING NETWORKS

(75) Inventors: Boon Jin Ang, Butterworth (MY); Bee Yee Ng, Temerloh (MY); Eng Huat Lee, Penang (MY); Thow Pang Chong, Spg. Rengam (MY); Teng Kuan Koay, Ampang (MY)

(73) Assignee: Altera Corporation, San Jose, CA (US)

( * ) Notice: Subject to any disclaimer, the term of this patent is extended or adjusted under 35 U.S.C. 154(b) by 101 days.

(21) Appl. No.: 12/053,573

(22) Filed: Mar. 22, 2008

(51) Int. Cl.
*H03K 19/00* (2006.01)
(52) U.S. Cl. .......................................... 326/93; 326/41
(58) Field of Classification Search ............. 326/37–41, 326/93–98, 101, 102
See application file for complete search history.

(56) References Cited

U.S. PATENT DOCUMENTS

| | | | |
|---|---|---|---|
| 5,384,497 A * | 1/1995 | Britton et al. | 326/44 |
| 5,849,610 A | 12/1998 | Zhu | |
| 6,204,689 B1 * | 3/2001 | Percey et al. | 326/41 |
| 6,442,737 B1 | 8/2002 | Tetelbaum et al. | |
| 6,502,222 B1 | 12/2002 | Tetelbaum | |
| 6,698,006 B1 | 2/2004 | Srinivasan et al. | |
| 6,952,813 B1 | 10/2005 | Rahut | |
| 7,191,418 B2 | 3/2007 | Lee et al. | |
| 7,216,322 B2 | 5/2007 | Lai et al. | |

* cited by examiner

Primary Examiner—Don P Le
(74) Attorney, Agent, or Firm—Steven J. Cahill

(57) ABSTRACT

A circuit includes a clock routing network. The clock routing network includes first and second clock paths. The first clock path routes a first clock signal to sub-circuits in the circuit. The first clock path has first buffers that buffer the first clock signal at the sub-circuits and first conductors in a first conductive layer of the circuit that transmit the first clock signal. The second clock path routes a second clock signal to the sub-circuits. The second clock path has second buffers that buffer the second clock signal at the sub-circuits, second conductors in the first conductive layer that transmit the second clock signal, and third conductors in a second conductive layer of the circuit. The second clock signal is routed through the third conductors at overlaps between the first clock path and the second clock path.

20 Claims, 7 Drawing Sheets

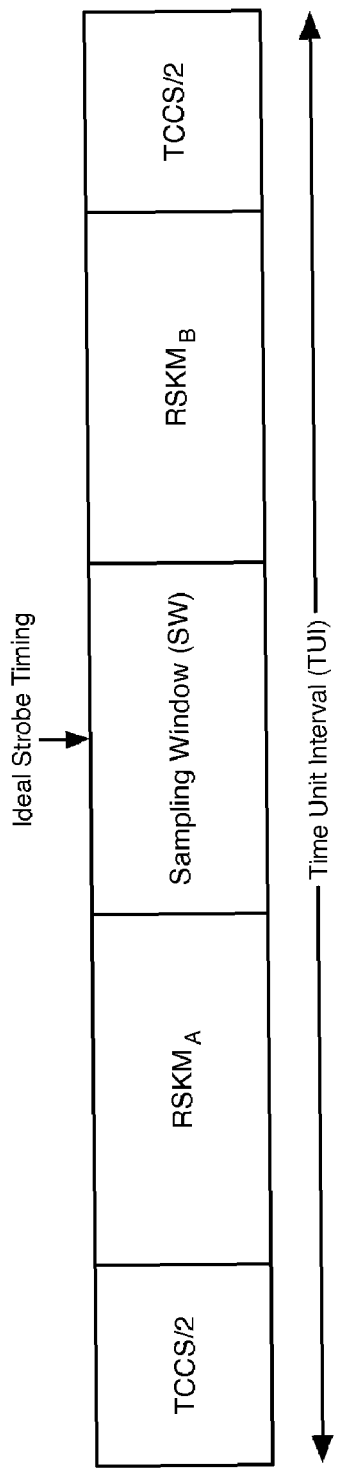
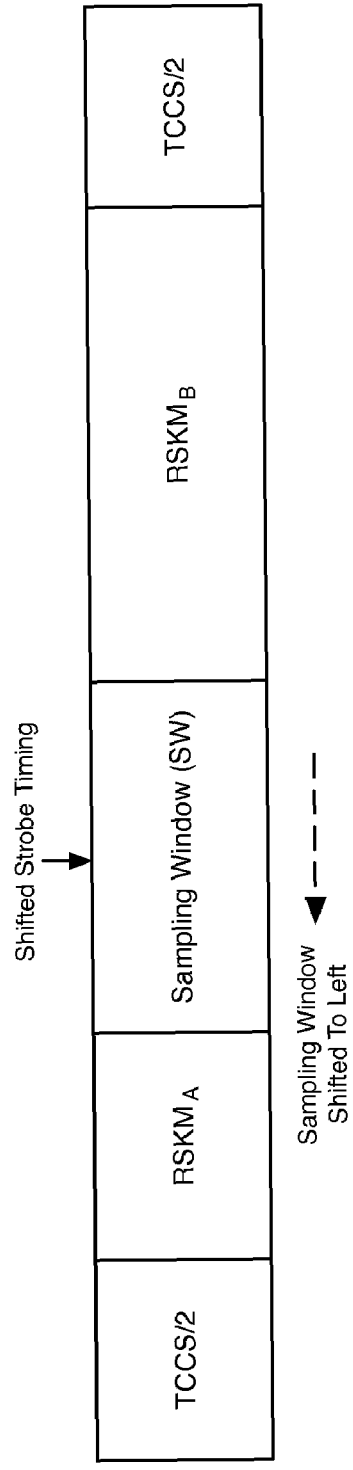
FIG. 1A
FIG. 1B

US 7,639,047 B1

TECHNIQUES FOR REDUCING CLOCK SKEW IN CLOCK ROUTING NETWORKS

BACKGROUND OF THE INVENTION

The present invention relates to electronic circuits, and more particularly, to techniques for reducing clock skew in clock routing networks.

A clock signal is a periodic signal that is typically used to control the operation of circuits. A clock signal typically oscillates between a logic high state and a logic low state.

BRIEF SUMMARY OF THE INVENTION

According to some embodiments of the present invention, a circuit includes a clock routing network. The clock routing network includes at least first and second clock paths. The first clock path routes a first clock signal to sub-circuits in the circuit. The first clock path has first buffers that buffer the first clock signal at the sub-circuits and first conductors in a first conductive layer of the circuit that transmit the first clock signal. The second clock path routes a second clock signal to the sub-circuits. The second clock path has second buffers that buffer the second clock signal at the sub-circuits, second conductors in the first conductive layer that transmit the second clock signal, and third conductors in a second conductive layer of the circuit. The second clock signal is routed through the third conductors at overlaps between the first clock path and the second clock path.

Various objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 1A is a diagram that shows the ideal timing of the strobe signal.

FIG. 1B is a diagram that shows an example of the strobe signal and the sampling window shifted to the left.

DETAILED DESCRIPTION OF THE INVENTION

Figure 2:
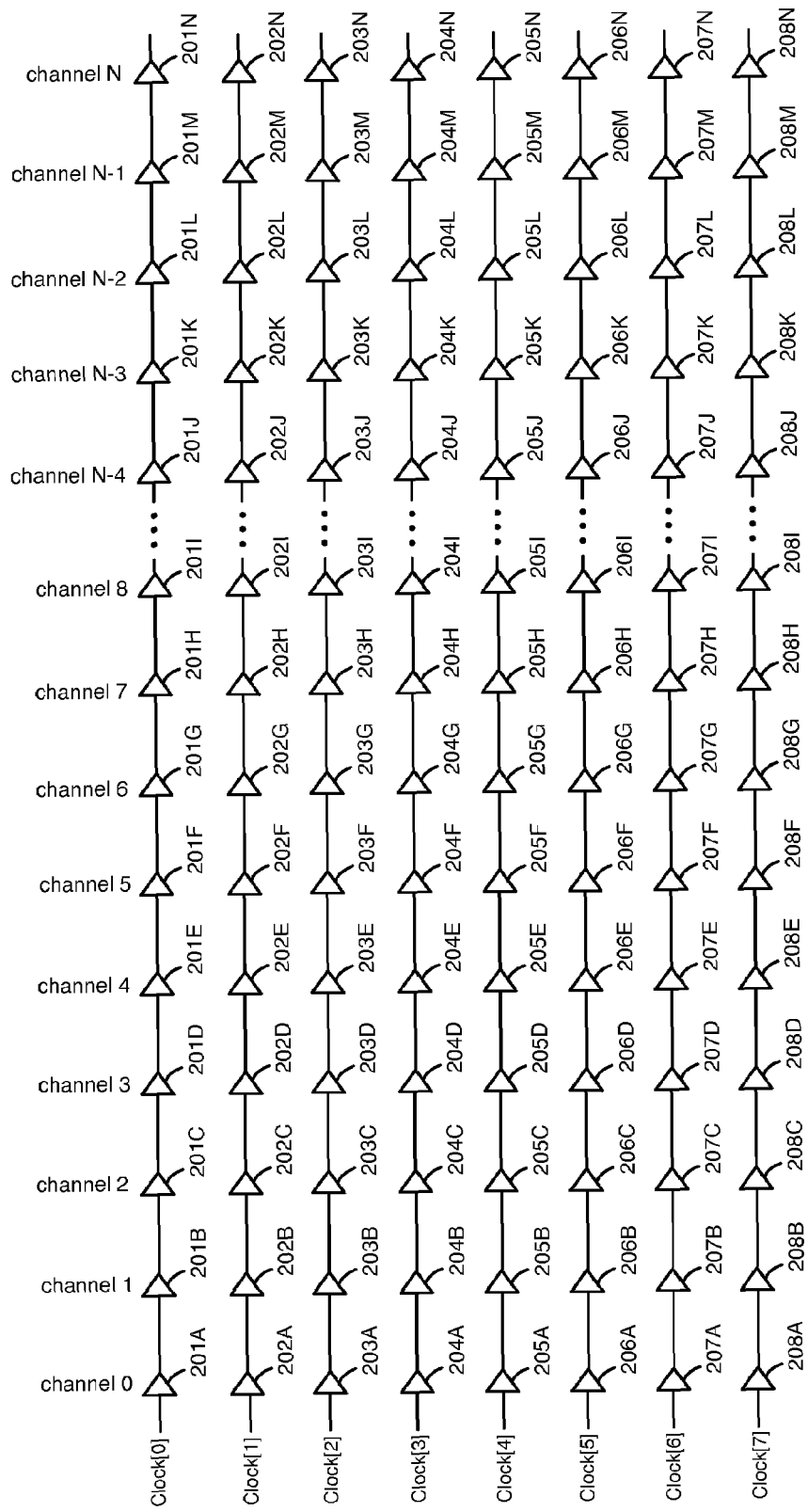
FIG. 2 illustrates an example of a clock tree that transmits 8 dynamic phase alignment (DPA) clock signals to an N number of different channels on an integrated circuit.

For a high-speed interface, such as a low voltage differential signaling (LVDS) interface, the clock signal and the data stream are transmitted separately from chip-to-chip. The clock signal and the data are realigned at the receiver end so that the data can be sampled at the correct time.

In some field programmable gate array (FPGA) devices, dynamic phase alignment (DPA) is used to support high-speed LVDS interfaces. DPA is a special mode of a high-speed LVDS receiver interface that automatically samples the incoming data using a clock signal having an optimal phase. The clock signal is selected from among 8 clock signals that have 8 different phases. Each of these 8 clock signals is offset in phase by 45 degrees relative to two of the other clock signals. The 8 clock signals have phases of 0, 45, 90, 135, 180, 225, 270, and 315 degrees.

DPA circuitry receives a high-speed serial data stream from an LVDS input buffer in the receiver. The DPA circuitry then selects the clock signal having the optimal phase from among the 8 clock signals to sample the data in the data valid window. The data valid window is a period of time during which a bit of data is valid and can be accurately sampled. The sampling window (SW) refers to the period of time during which a data bit is actually sampled. The sampling window must overlap with the data valid window in time so that the data bit can be accurately sampled.

The maximum phase offset between the data and the phase-aligned clock signal that can occur without corrupting the data during the sampling process is dependent on how precisely the 45-degree phase relationship between the 8 clock signals is preserved at every data channel. The maximum phase offset between the data and the phase-aligned clock signal is ⅛ times the time unit interval (TUI). One-eighth the time unit interval (TUI) is the maximum quantization error of the DPA clock signal.

In designs that use the LVDS input/output (I/O) standard, the receiver input skew margin (RSKM) is the time margin available before the LVDS receiver fails to operate. RSKM is the total time margin that remains after subtracting the sampling window (SW) time period and the transmitter channel-to-channel skew (TCCS) from the time unit interval (TUI). Equation (1) below is an expression for the RSKM.

$$RSKM=(TUI-SW-TCCS)/2 \qquad (1)$$

The time unit interval (TUI) is the period of the LVDS clock signal ($1/F_{MAX}$), where $F_{MAX}$ is the maximum frequency of the LVDS clock signal.

FIG. 1A is a diagram that shows the ideal timing of the strobe signal. The strobe signal is a signal that indicates to the receiver when to sample the data. The strobe signal is generated using one of the 8 clock signals that have 8 different phases. The ideal timing of the strobe signal is at the center of the sampling window as shown in FIG. 1A.

The strobe signal changes state at the center of the sampling window to indicate when to sample the data in the data channel. The sampling window is bounded on each side by the receiver input skew margin ($RSKM_A$ and $RSKM_B$) and the transmitter channel-to-channel skew (TCCS). The first half of the transmitter channel-to-channel skew (TCCS/2) occurs prior to $RSKM_A$, and the second half of the transmitter channel-to-channel skew (TCCS/2) occurs after $RSKM_B$.

The quantization error $E_{DPA}$ of the 8 DPA clock signals equals ⅛(TUI)+Skew, where Skew refers to the skew between the phases of the 8 clock signals at a data channel. The quantization error is closely related to the timing of the strobe signal.

A large quantization error causes the timing of the strobe signal and the sampling window to be shifted so that they occur earlier or later in time. FIG. 1B is a diagram that shows an example of the strobe signal and the sampling window shifted to the left (i.e., earlier in time). In FIG. 1A, the strobe signal occurs at the center of the time unit interval (TUI). Skew in the clock signal used to generate the strobe signal can cause the strobe signal and the center of the sampling window to occur before or after the center of the TUI. In the example of FIG. 1B, skew in the clock signal that is used to generate the strobe signal causes the strobe signal to occur before the center of the TUI.

The clock signal that has the closest phase to the data signal is selected to generate the strobe signal so that the strobe signal occurs as close to the center of the data valid window as possible to prevent corruption of the data. However, skew in the 8 clock signals may be large enough so that none of the clock signals have a phase that begins near the center of the data valid window. When the strobe signal occurs far enough away from the center of the data valid window in time, the data may not be accurately sampled, and the data may become corrupted.

A large quantization error reduces the receiver input skew margin (RSKM). A reduced RSKM causes FPGA customers to have less timing margin for their board designs. When the timing of the strobe signal is shifted away from the center of the TUI, the effective RSKM is smaller than the ideal RSKM. In FIG. 1B, $RSKM_A$ is less than $RSKM_B$, because the strobe signal occurs earlier in time than the center of the TUI. In FIG. 1B, the effective RSKM equals $RSKM_A$, reducing the margin available to sample the data. A reduced RSKM usually requires a reduction in the maximum frequency $F_{MAX}$ of the LVDS clock signal, which slows down the performance of the FPGA.

A clock routing network is used to transmit the dynamic phase alignment (DPA) clock signals from channel to channel within an integrated circuit, such as an FPGA. A clock tree is an example of a clock routing network. FIG. 2 illustrates an example of a clock tree that transmits 8 DPA clock signals to an N number of different data channels on an integrated circuit. The clock tree of FIG. 2 is typically not a balanced clock tree. Although the clock signals do not have to be phase aligned between data channels, the 45-degree phase relationship between the 8 clock signals is important to maintain within each data channel in order to ensure the accuracy of the DPA system.

In some FPGAs, the 8 clock signals are stitched and buffered from channel to channel to build the whole clock tree. In FIG. 2, eight clock signals Clock[0]-Clock[7] are transmitted to an N number of channels, where N equals any positive integer. Clock[0] has a 0° phase, Clock[1] has a 45° phase, Clock[2] has a 90° phase, Clock[3] has a 135° phase, Clock[4] has a 180° phase, Clock[5] has a 225° phase, Clock[6] has a 270° phase, and Clock[7] has a 315° phase. These phases are ideal phases.

Clock signals Clock[0]-Clock[7] are buffered by buffers 201-208 at each channel before being transmitted to the next channel. Each row of buffers 201-208 and the conductors that connect the buffers in that row form one clock path. Clock[0] is routed through a first row of buffers 201A-201N and conductors from channel to channel through a first clock path. Clock[1] is routed through a second row of buffers 202A-202N and conductors from channel to channel through a second clock path. Clock[2] is routed through a third row of buffers 203A-203N and conductors from channel to channel through a third clock path. Clock[3] is routed through a fourth row of buffers 204A-204N and conductors from channel to channel through a fourth clock path. Clock[4] is routed through a fifth row of buffers 205A-205N and conductors from channel to channel through a fifth clock path. Clock[5] is routed through a sixth row of buffers 206A-206N and conductors from channel to channel through a sixth clock path. Clock[6] is routed through a seventh row of buffers 207A-207N and conductors from channel to channel through a seventh clock path. Clock[7] is routed through an eighth row of buffers 208A-208N and conductors from channel to channel through an eighth clock path. The 8 clock paths are routed next to each other in parallel throughout the integrated circuit. The conductors that route clock signals Clock[0]-Clock[7] between the buffers are all formed in the same single conductive layer of the integrated circuit.

Ideally, the layout of the integrated circuit should route the 8 clock signals symmetrically to minimize the clock skew. However, variations in the layout of the integrated circuit can cause the 8 clock paths shown in FIG. 2 to have different lengths. Also, variations in the semiconductor process within the integrated circuit can cause the 8 clock paths to have different lengths. When the clock paths have different lengths, the clock skew between clock signals Clock[0]-Clock[7] at each channel may be significant enough to corrupt the data.

A non-uniform temperature distribution within a single integrated circuit can increase the clock skew between the 8 clock signals Clock[0]-Clock[7] from channel to channel. In addition, a non-ideal layout that generates a significant amount of coupling capacitance from the top and bottom layers can increase the clock skew between the 8 clock signals Clock[0]-Clock[7] from channel to channel.

As the clock skew accumulates across multiple channels, the phase relationship between the 8 clock signals Clock[0]-Clock[7] is not maintained equally. For example, assuming clock signals Clock[0]-Clock[7] have a frequency of 1.25 GHz, a period of 800 ps, and a $\frac{1}{8}^{th}$ period of 100 ps, the clock skew between clock signals Clock[0] and Clock[7] at channel 48 may be 50.40 picoseconds (ps), which corresponds to a clock skew of more than 50% of the ideal 45° phase offset between Clock[0] and Clock[7].

The quantization error of the clock tree increases in proportion to the clock skew. To reduce the quantization error, the clock skew can be reduced using a routing averaging technique. A routing averaging technique averages the clock skews among the clock signals to eliminate or to reduce the accumulated clock skew across multiple channels. A routing averaging technique can be implemented using several different configurations.

Figure 3:
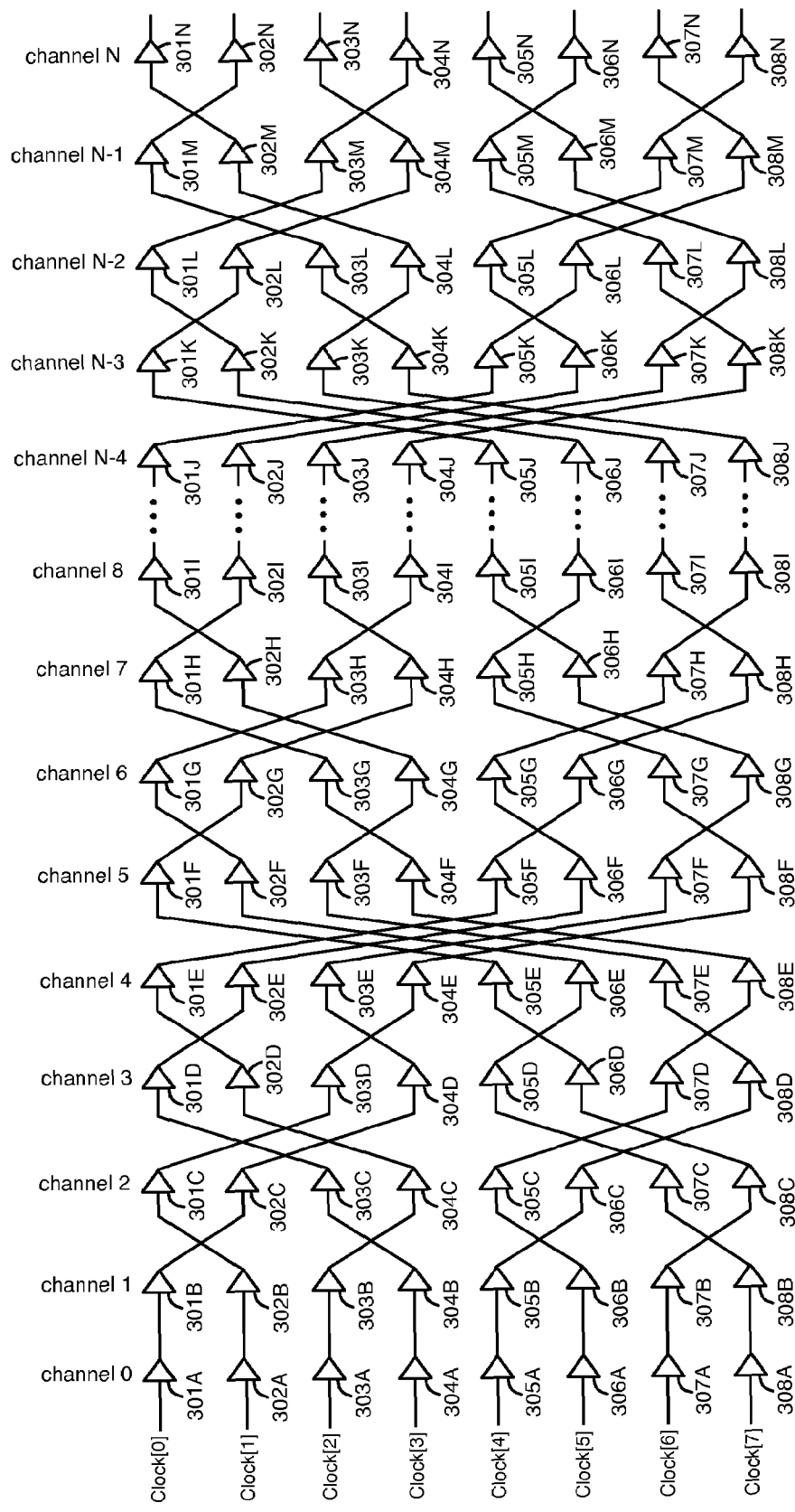
FIG. 3 illustrates an example of a clock routing network that implements a routing averaging technique for reducing clock skew between clock signals, according to an embodiment of the present invention.

FIG. 3 illustrates an example of a clock routing network that implements a routing averaging technique for reducing clock skew between clock signals, according to an embodiment of the present invention. In the clock routing network of FIG. 3, 8 clock signals Clock[0]-Clock[7] are routed to an N number of channels on an integrated circuit, where N is any suitable positive integer (e.g., 48). The 8 clock signals Clock[0]-Clock[7] have ideal phases of 0°, 45°, 90°, 135°, 180°, 225°, 270°, and 315°, respectively.

Buffers 301A-308N buffer the clock signals Clock[0]-Clock[7] at each channel. The buffers drive the clock signals from channel to channel. The buffers are arranged in rows in FIG. 3, e.g., buffer row 301A-301N, buffer row 302A-302N, etc. Buffers 301A-308N are shown in straight horizontal rows in FIG. 3 as an example. Buffers 301A-308N can be laid out in any desired configuration on the integrated circuit. For example, the buffers can be laid out in a serpentine manner on the integrated circuit.

Channels 0-N shown in FIG. 3 can be data channels that receive and process data signals. According to alternative embodiments, the clock routing network of FIG. 3 can route clock signals to other types of sub-circuits in an integrated circuit instead of data channels. For example, the clock routing network of FIG. 3 can route clock signals to programmable logic blocks in an FPGA that are configured to perform any of a variety of different user functions.

Factors such as process variations, temperature variations, and a non-ideal layout may cause the buffers and the conductors in each row to have significantly different delays. The differential delays between the 8 rows may increase the clock skew between the 8 clock signals. In order to reduce the clock skew between clock signals Clock[0]-Clock[7], each of the 8 clock signals is routed through all 8 rows of buffers 301-308 and all 8 rows of conductors across 8 channels in the clock routing network of FIG. 3. For example, each of the 8 clock signals Clock[0]-Clock[7] is routed through all 8 rows of buffers 301-308 and conductors in a clock path from channel 1 to channel 8.

In clock path 1, clock signal Clock[0] is routed from buffer 301A at channel 0 to buffer 301B at channel 1, to buffer 302C at channel 2, to buffer 304D at channel 3, to buffer 303E at channel 4, to buffer 307F at channel 5, to buffer 308G at channel 6, to buffer 306H at channel 7, to buffer 305I at channel 8, etc. In clock path 2, clock signal Clock[1] is routed from buffer 302A at channel 0 to buffer 302B at channel 1, to buffer 301C at channel 2, to buffer 303D at channel 3, to buffer 304E at channel 4, to buffer 308F at channel 5, to buffer 307G at channel 6, to buffer 305H at channel 7, to buffer 306I at channel 8, etc.

In clock path 3, clock signal Clock[2] is routed from buffer 303A at channel 0 to buffer 303B at channel 1, to buffer 304C at channel 2, to buffer 302D at channel 3, to buffer 301E at channel 4, to buffer 305F at channel 5, to buffer 306G at channel 6, to buffer 308H at channel 7, to buffer 307I at channel 8, etc. In clock path 4, clock signal [3] is routed from buffer 304A at channel 0 to buffer 304B at channel 1, to buffer 303C at channel 2, to buffer 301D at channel 3, to buffer 302E at channel 4, to buffer 306F at channel 5, to buffer 305G at channel 6, to channel 307H at channel 7, to buffer 308I at channel 8, etc.

In clock path 5, clock signal Clock[4] is routed from buffer 305A at channel 0 to buffer 305B at channel 1, to buffer 306C at channel 2, to buffer 308D at channel 3, to buffer 307E at channel 4, to buffer 303F at channel 5, to buffer 304G at channel 6, to buffer 302H at channel 7, to buffer 301I at channel 8, etc. In clock path 6, clock signal Clock[5] is routed from buffer 306A at channel 0 to buffer 306B at channel 1, to buffer 305C at channel 2, to buffer 307D at channel 3, to buffer 308E at channel 4, to buffer 304F at channel 5, to buffer 303G at channel 6, to buffer 301H at channel 7, to buffer 302I at channel 8, etc.

In clock path 7, clock signal Clock[6] is routed from buffer 307A at channel 0 to buffer 307B at channel 1, to buffer 308C at channel 2, to buffer 306D at channel 3, to buffer 305E at channel 4, to buffer 301F at channel 5, to buffer 302G at channel 6, to buffer 304H at channel 7, to buffer 303I at channel 8, etc. In clock path 8, clock signal Clock[7] is routed from buffer 308A at channel 0 to buffer 308B at channel 1, to buffer 307C at channel 2, to buffer 305D at channel 3, to buffer 306E at channel 4, to buffer 302F at channel 5, to buffer 301G at channel 6, to buffer 303H at channel 7, to buffer 304I at channel 8, etc.

The routing configurations of the 8 clock paths shown in FIG. 3 for clock signals Clock[0]-Clock[7] from channels 1-8 are repeated across every subsequent set of 8 channels, i.e., channels 9-16, channels 17-24, channels 25-32, channels 33-40, etc.

In the clock routing network of FIG. 3, each of the clock signals Clock[0]-Clock[7] is routed through all 8 rows of buffers and conductors across each set of 8 channels, i.e., channels 1-8, channels 9-16, channels 17-24, channels 25-32, channels 33-40, etc. More generally, each of M clock signals is routed through every one of M rows of buffers and conductors across each set of M channels, where M equals 8 or any other suitable number of clock signals. By routing each of the clock signals Clock[0]-Clock[7] through all 8 rows of buffers and conductors across each set of 8 channels, the delay of each of the 8 rows is averaged among the 8 clock signals Clock[0]-Clock[7] in the 8 clock paths, which substantially reduces the clock skew between the clock signals at each channel.

Eight clock signals are used as an example in FIG. 3 and in other embodiments described herein. It should be understood that any appropriate number of clock signals can be used. For example, 9 clock signals can be routed through 9 clock paths across 9 channels.

The conductors that route the clock signals between the channels in the clock paths of FIG. 3 are primarily formed in the same single conductive layer of the integrated circuit. The clock paths that route the clock signals cross each other between channels 1-N at multiple locations in the clock routing network of FIG. 3. For example, clock paths 1 and 2 cross each other between channels 1 and 2. When two clock paths cross each other in the clock routing network of FIG. 3, the first clock path routes a first clock signal from one side of the second clock path to the other side of the second clock path, and the second clock path routes a second clock signal from one side of the first clock path to the other side of the first clock path.

To prevent two conductors from being shorted where clock paths cross in the clock routing network of FIG. 3, one of the clock signals is routed through an additional conductive layer of the integrated circuit so that two clock signals are not shorted together in the same conductive layer. For example, clock signal Clock[1] can be routed from channel 1 to channel 2 by routing Clock[1] from a conductor in metal layer 1 to a conductor in metal layer 2 so that Clock[1] overlaps Clock [0] in metal layer 2. Clock[1] is then routed from the conductor in metal layer 2 to another conductor in metal layer 1 after crossing over (or under) Clock[0]. If Clock[1] is routed between channels 1 and 2 through a conductor in metal layer 2 to crossover Clock[0], then Clock[0] can be routed between channel 1 and channel 2 entirely through a conductor in metal layer 1, without routing through metal layer 2. Clock path 2 transmits clock signal Clock[1] to subsequent channels on both sides of clock path 1 as shown in FIG. 3 by routing clock signal Clock[1] through conductors in metal layer 2 (or another conductive layer) at each overlap with Clock[0] in clock path 1.

Routing the clock signals to additional conductive layers to crossover each other may introduce additional clock skews into the clock signals Clock[0]-Clock[7]. However, the additional clock skews introduced by the crossovers are usually insignificant compared to the phases of the clock signals, because the crossovers (e.g., routing from a conductor in metal layer 1 to a conductor in metal layer 2 and back to another conductor in metal layer 1) are typically short compared to the routing length of the clock routing network.

The clock skew and the phase quantization error between multi-phase clock signals can be significantly reduced by implementing the routing averaging technique of FIG. 3 or other routing averaging techniques. For example, assuming clock signals Clock[0]-Clock[7] have frequencies of 1.25 GHz, periods of 800 ps, and $\frac{1}{8}^{th}$ periods of 100 ps, the routing averaging technique of FIG. 3 can reduce the clock skew between clock signal Clock[0] and clock signal Clock[7] to a maximum of 2.40 picoseconds, which corresponds to a clock skew of 1.08° from the ideal phase offset. A 1.08° clock skew corresponds to a phase error of only 2.4% of the ideal 45° phase offset.

The routing averaging techniques achieve a higher system performance with a smaller quantization error. A smaller quantization error causes the timing of the strobe signal to be closer to the center of the data valid window. When the strobe signal occurs closer to the center of the data valid window, a user's board design has more RSKM margin, and the maximum clock signal frequency of the FPGA design can be increased.

Figure 4:
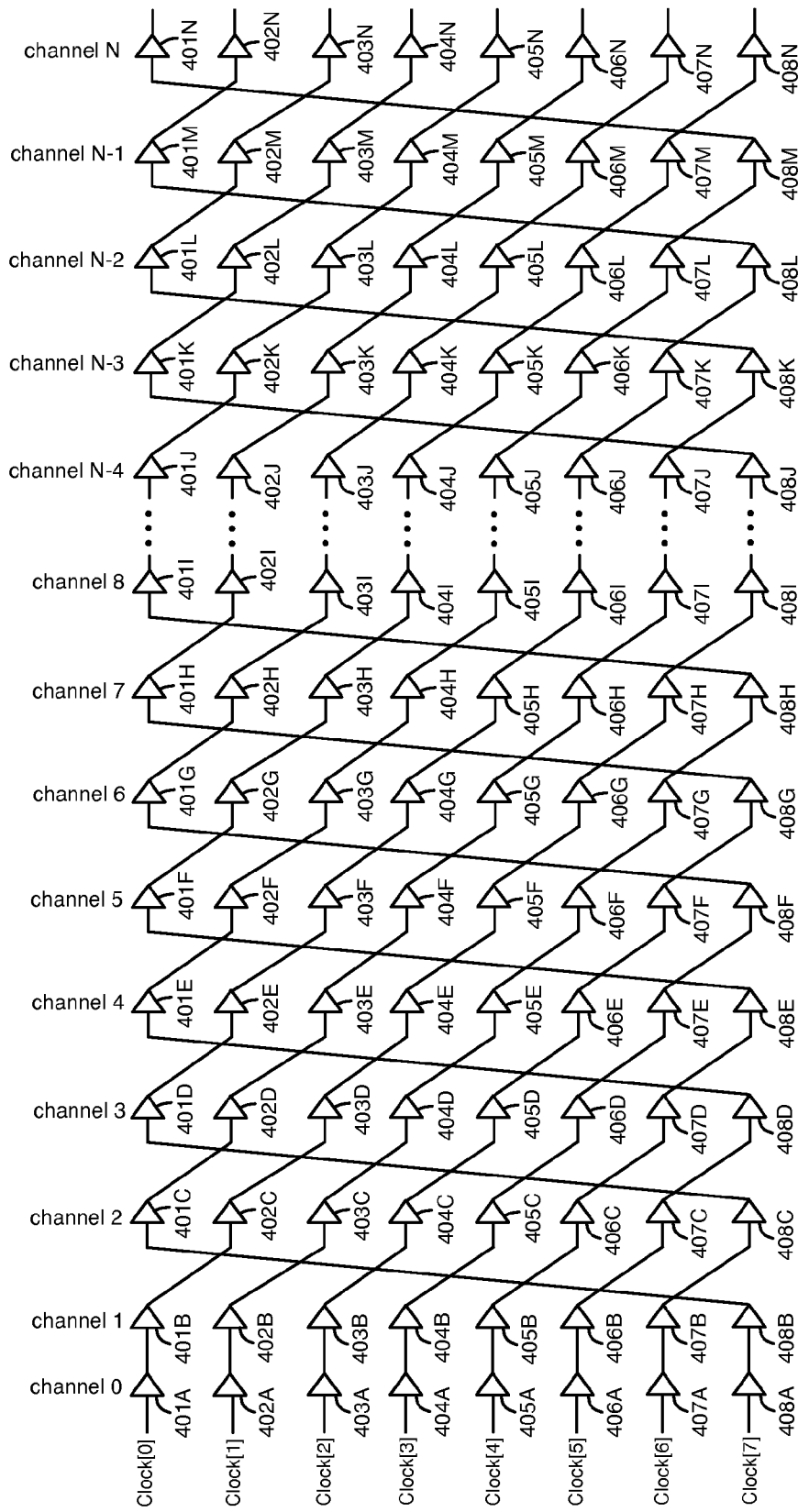
FIG. 4 illustrates another example of a clock routing network that implements a routing averaging technique for reducing clock skew between clock signals, according to an embodiment of the present invention.

FIG. 4 illustrates another example of a clock routing network that implements a routing averaging technique for reducing clock skew between clock signals, according to an embodiment of the present invention. In the clock routing network of FIG. 4, 8 clock signals Clock[0]-Clock[7] are routed to an N number of channels on an integrated circuit, where N is any suitable positive integer. The 8 clock signals Clock[0]-Clock[7] ideally have phases of 0°, 45°, 90°, 135°, 180°, 225°, 270°, and 315°, respectively.

Clock signals Clock[0]-Clock[7] are buffered by buffers 401-408 at each channel before being transmitted to the next channel. Although each row of buffers 401-408 is shown as a straight horizontal row in FIG. 4, the rows of buffers can be laid out in any desired configuration on the integrated circuit.

The conductors and the buffers in each row in FIG. 4 may have significantly different delays that cause clock skew between the clock signals at a channel. In order to reduce the clock skew between clock signals Clock[0]-Clock[7] at each channel, each of the 8 clock signals is routed through all 8 rows of buffers and conductors in a clock path across 8 channels in the clock routing network of FIG. 4, according to a routing averaging technique.

In clock path 1, clock signal Clock[0] is routed from buffer 401A at channel 0 to buffer 401B at channel 1, to buffer 402C at channel 2, to buffer 403D at channel 3, to buffer 404E at channel 4, to buffer 405F at channel 5, to buffer 406G at channel 6, to buffer 407H at channel 7, to buffer 408I at channel 8, etc. In clock path 2, clock signal Clock[1] is routed from buffer 402A at channel 0 to buffer 402B at channel 1, to buffer 403C at channel 2, to buffer 404D at channel 3, to buffer 405E at channel 4, to buffer 406F at channel 5, to buffer 407G at channel 6, to buffer 408H at channel 7, to buffer 401I at channel 8, etc.

In clock path 3, clock signal clock[2] is routed from buffer 403A at channel 0 to buffer 403B at channel 1, to buffer 404C at channel 2, to buffer 405D at channel 3, to buffer 406E at channel 4, to buffer 407F at channel 5, to buffer 408G at channel 6, to buffer 401H at channel 7, to buffer 402I at channel 8, etc. In clock path 4, clock signal Clock[3] is routed from buffer 404A at channel 0 to buffer 404B at channel 1, to buffer 405C at channel 2, to buffer 406D at channel 3, to buffer 407E at channel 4, to buffer 408F at channel 5, to buffer 401G at channel 6, to buffer 402H at channel 7, to buffer 403I at channel 8, etc.

In clock path 5, clock signal Clock[4] is routed from buffer 405A at channel 0 to buffer 405B at channel 1, to buffer 406C at channel 2, to buffer 407D at channel 3, to buffer 408E at channel 4, to buffer 401F at channel 5, to buffer 402G at channel 6, to buffer 403H at channel 7, to buffer 404I at channel 8, etc. In clock path 6, clock signal Clock[5] is routed from buffer 406A at channel 0 to buffer 406B at channel 1, to buffer 407C at channel 2, to buffer 408D at channel 3, to buffer 401E at channel 4, to buffer 402F at channel 5, to buffer 403G at channel 6, to buffer 404H at channel 7, to buffer 405I at channel 8, etc.

In clock path 7, clock signal Clock[6] is routed from buffer 407A at channel 0 to buffer 407B at channel 1, to buffer 408C at channel 2, to buffer 401D at channel 3, to buffer 402E at channel 4, to buffer 403F at channel 5, to buffer 404G at channel 6, to buffer 405H at channel 7, to buffer 406I at channel 8, etc. In clock path 8, clock signal Clock[7] is routed from buffer 408A at channel 0 to buffer 408B at channel 1, to buffer 401C at channel 2, to buffer 402D at channel 3, to buffer 403E at channel 4, to buffer 404F at channel 5, to buffer 405G at channel 6, to buffer 406H at channel 7, to buffer 407I at channel 8, etc.

The routing configurations for the 8 clock paths shown in FIG. 4 from channels 1-8 are repeated across every subsequent set of 8 channels, i.e., channels 9-16, channels 17-24, channels 25-32, etc. In the clock routing network of FIG. 4, each of the clock signals Clock[0]-Clock[7] is routed through all 8 rows of buffers and conductors across each set of 8 channels, i.e., channels 1-8, channels 9-16, channel 17-24, channels 25-32, etc. By routing each of the clock signals Clock[0]-Clock[7] through all 8 rows across each set of 8 channels, the delay of each of the rows is averaged among the 8 clock signals Clock[0]-Clock[7]. More generally, each of M clock signals is routed through every one of M rows of buffers and conductors across each set of M channels, where M equals 8 or any other suitable number of clock signals.

The routing averaging technique of FIG. 4 reduces the clock skew and the phase quantization error between the clock signals. The routing averaging technique of FIG. 4 also achieves a higher system performance with a smaller quantization error. As a result, the timing of the strobe signal occurs closer to the center of the data valid window.

If the conductors that route the clock signals between the channels in the clock paths of FIG. 4 are formed primarily in the same conductive layer of the integrated circuit, one of the clock signals can be transmitted from one row of buffers to another row of buffers where two clock paths cross by routing the clock signal through one or more additional conductive layers of the integrated circuit to prevent the clock signals from shorting together in the same conductive layer, as mentioned above with respect to FIG. 3.

Figure 5:
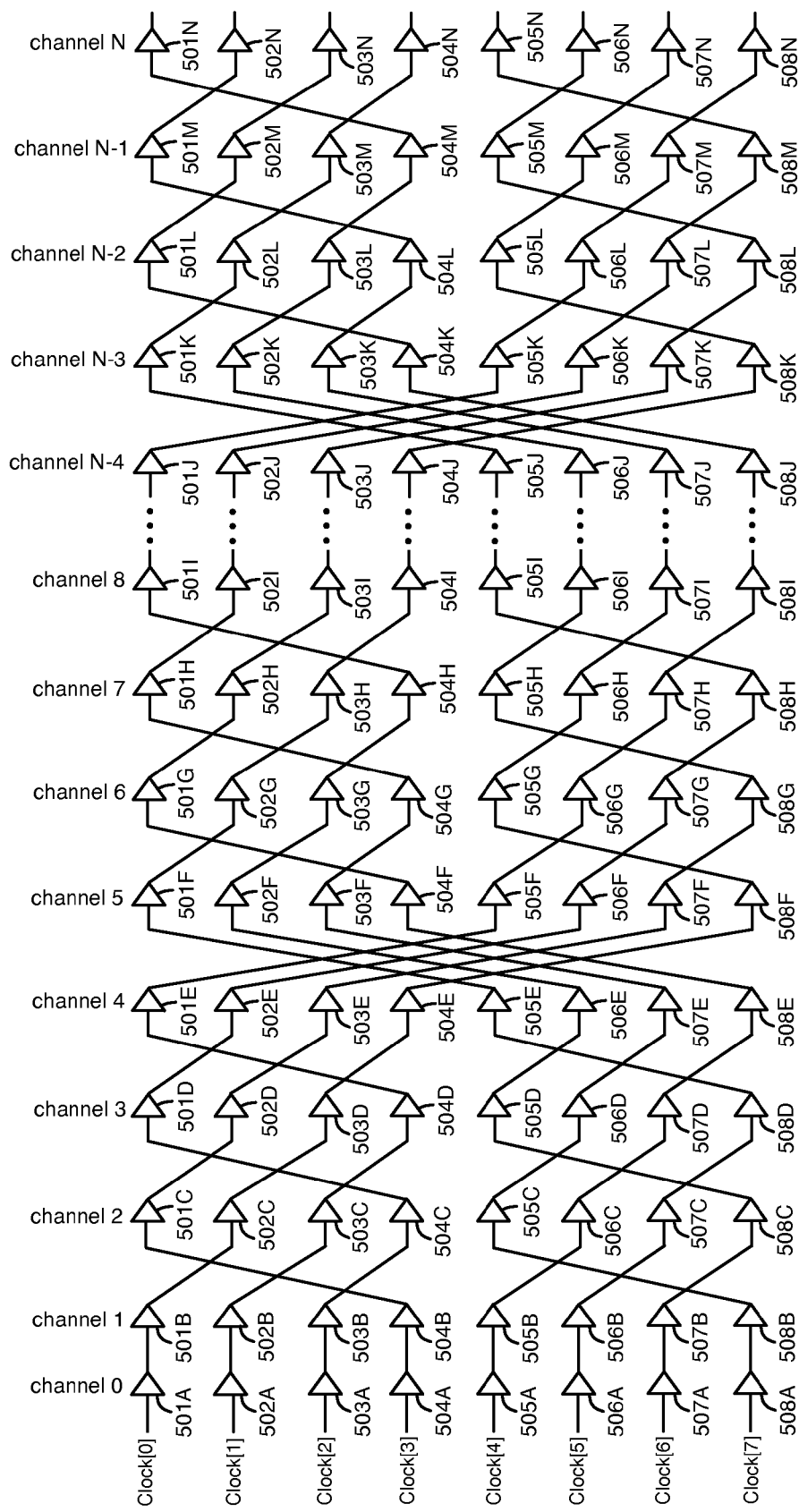
FIG. 5 illustrates yet another example of a clock routing network that implements a routing averaging technique for reducing clock skew between clock signals, according to an embodiment of the present invention.

FIG. 5 illustrates yet another example of a clock routing network that implements a routing averaging technique for reducing clock skew between clock signals, according to an embodiment of the present invention. In the clock routing network of FIG. 5, 8 clock signals Clock[0]-Clock[7] are routed to an N number of channels on an integrated circuit, where N is any suitable positive integer.

Clock signals Clock[0]-Clock[7] are buffered by buffers 501-508 at each channel before being transmitted to the next channel. Although each row of buffers 501-508 is shown as a straight horizontal row in FIG. 5, the rows of buffers can be laid out in any desired configuration on the integrated circuit.

In order to reduce the clock skew between clock signals Clock[0]-Clock[7] at each channel, each of the 8 clock signals is routed through all 8 rows of buffers and conductors in a clock path across each set of 8 channels in FIG. 5, i.e., from channel 1 to channel 8, from channel 9 to channel 16, from channel 17 to channel 24, etc.

In clock path 1, clock signal Clock[0] is routed from buffer 501A at channel 0 to buffer 501B at channel 1, to buffer 502C at channel 2, to buffer 503D at channel 3, to buffer 504E at channel 4, to buffer 508F at channel 5, to buffer 505G at channel 6, to buffer 506H at channel 7, to buffer 507I at channel 8, etc. In clock path 2, clock signal Clock[1] is routed from buffer 502A at channel 0 to buffer 502B at channel 1, to buffer 503C at channel 2, to buffer 504D at channel 3, to buffer 501E at channel 4, to buffer 505F at channel 5, to buffer 506G at channel 6, to buffer 507H at channel 7, to buffer 508I at channel 8, etc.

In clock path 3, clock signal Clock[2] is routed from buffer 503A at channel 0 to buffer 503B at channel 1, to buffer 504C at channel 2, to buffer 501D at channel 3, to buffer 502E at channel 4, to buffer 506F at channel 5, to buffer 507G at channel 6, to buffer 508H at channel 7, to buffer 505I at channel 8, etc. In clock path 4, clock signal Clock[3] is routed from buffer 504A at channel 0 to buffer 504B at channel 1, to buffer 501C at channel 2, to buffer 502D at channel 3, to buffer 503E at channel 4, to buffer 507F at channel 5, to buffer 508G at channel 6, to buffer 505H at channel 7, to buffer 506I at channel 8, etc.

In clock path 5, clock signal Clock[4] is routed from buffer 505A at channel 0 to buffer 505B at channel 1, to buffer 506C at channel 2, to buffer 507D at channel 3, to buffer 508E at channel 4, to buffer 504F at channel 5, to buffer 501G at channel 6, to buffer 502H at channel 7, to buffer 503I at channel 8, etc. In clock path 6, clock signal Clock[5] is routed from buffer 506A at channel 0 to buffer 506B at channel 1, to buffer 507C at channel 2, to buffer 508D at channel 3, to buffer 505E at channel 4, to buffer 501F at channel 5, to buffer 502G at channel 6, to buffer 503H at channel 7, to buffer 504I at channel 8, etc.

In clock path 7, clock signal Clock[6] is routed from buffer 507A at channel 0 to buffer 507B at channel 1, to buffer 508C at channel 2, to buffer 505D at channel 3, to buffer 506E at channel 4, to buffer 502F at channel 5, to buffer 503G at channel 6, to buffer 504H at channel 7, to buffer 501I at channel 8, etc. In clock path 8, clock signal Clock[7] is routed from buffer 508A at channel 0 to buffer 508B at channel 1, to buffer 505C at channel 2, to buffer 506D at channel 3, to buffer 507E at channel 4, to buffer 503F at channel 5, to buffer 504G at channel 6, to buffer 501H at channel 7, to buffer 502I at channel 8, etc.

The routing configurations in the 8 clock paths shown in FIG. 5 for clock signals Clock[0]-Clock[7] between channels 1-8 are repeated across every subsequent set of 8 channels, i.e., channels 9-16, channels 17-24, channels 25-32, etc. The routing averaging technique of FIG. 5 reduces the clock skew and the phase quantization error between the clock signals, as with the previous embodiments.

Figure 6:
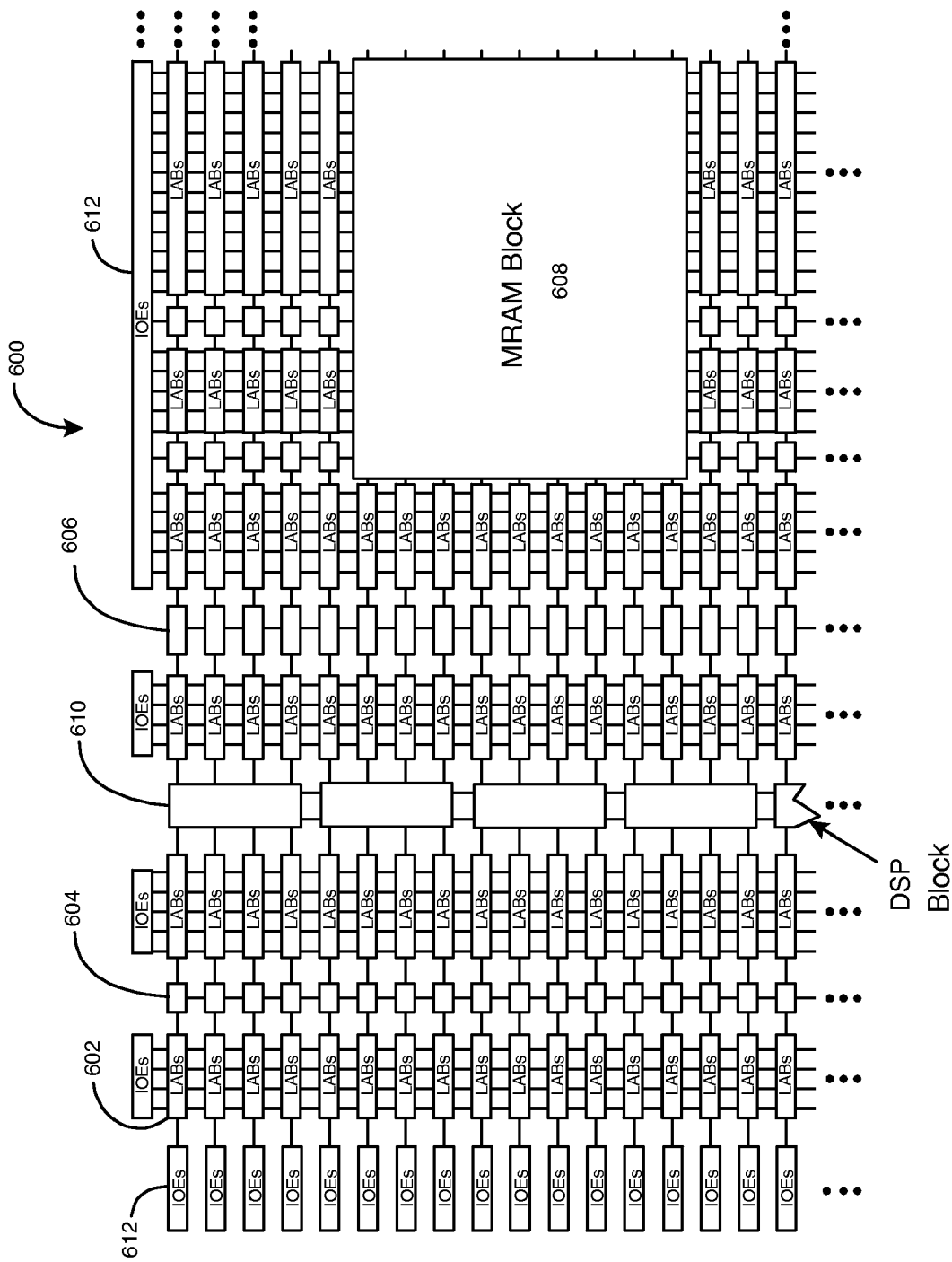
FIG. 6 is a simplified partial block diagram of a field programmable gate array (FPGA) that can include aspects of the present invention.

FIG. 6 is a simplified partial block diagram of a field programmable gate array (FPGA) 600 that can include aspects of the present invention. FPGA 600 is merely one example of an integrated circuit that can include features of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), and application specific integrated circuits (ASICs).

FPGA 600 includes a two-dimensional array of programmable logic array blocks (or LABs) 602 that are interconnected by a network of column and row interconnect conductors of varying length and speed. LABs 602 include multiple (e.g., 10) logic elements (or LEs).

An LE is a programmable logic circuit block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 600 also includes a distributed memory structure including random access memory (RAM) blocks of varying sizes provided throughout the array. The RAM blocks include, for example, blocks 604, blocks 606, and block 608. These memory blocks can also include shift registers and FIFO buffers.

FPGA 600 further includes digital signal processing (DSP) blocks 610 that can implement, for example, multipliers with add or subtract features. Input/output elements (IOEs) 612 located, in this example, around the periphery of the chip, support numerous single-ended and differential input/output standards. IOEs 612 are coupled to input/output pins. Each of the input/output pins is an external terminal of the FPGA. It is to be understood that FPGA 600 is described herein for illustrative purposes only and that the present invention can be implemented in many different types of PLDs, FPGAs, and ASICs.

Figure 7:
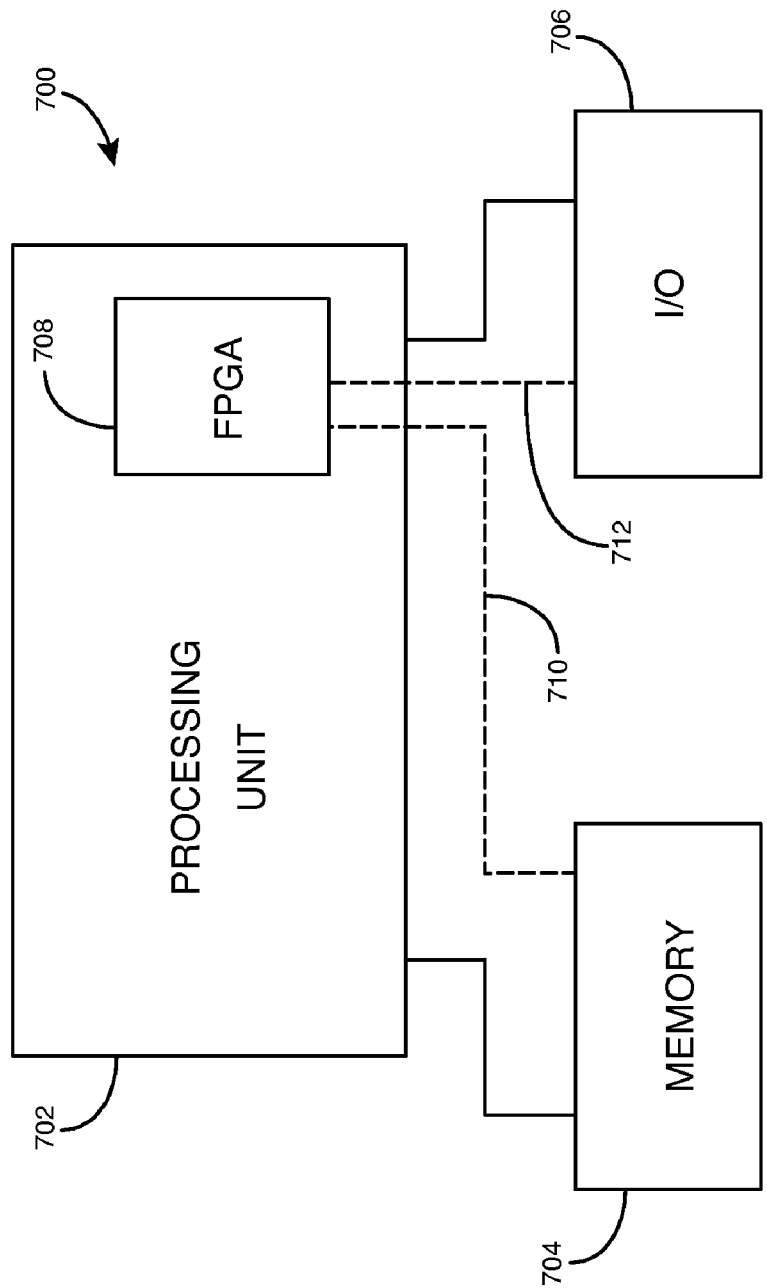
FIG. 7 shows a block diagram of an exemplary digital system that can embody techniques of the present invention.

The present invention can also be implemented in a system that has an FPGA as one of several components. FIG. 7 shows a block diagram of an exemplary digital system 700 that can embody techniques of the present invention. System 700 can be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 700 can be provided on a single board, on multiple boards, or within multiple enclosures.

System 700 includes a processing unit 702, a memory unit 704, and an input/output (I/O) unit 706 interconnected together by one or more buses. According to this exemplary embodiment, an FPGA 708 is embedded in processing unit 702. FPGA 708 can serve many different purposes within the system of FIG. 7. FPGA 708 can, for example, be a logical building block of processing unit 702, supporting its internal and external operations. FPGA 708 is programmed to implement the logical functions necessary to carry on its particular role in system operation. FPGA 708 can be specially coupled to memory 704 through connection 710 and to I/O unit 706 through connection 712.

Processing unit 702 can direct data to an appropriate system component for processing or storage, execute a program stored in memory 704, receive and transmit data via I/O unit 706, or other similar functions. Processing unit 702 can be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 708 can control the logical operations of the system. As another example, FPGA 708 acts as a reconfigurable processor, which can be reprogrammed as needed to handle a particular computing task. Alternatively, FPGA 708 can itself include an embedded microprocessor. Memory unit 704 can be a random access memory (RAM), read only memory (ROM), fixed or flexible disk media, flash memory, tape, or any other storage means, or any combination of these storage means.

The foregoing description of the exemplary embodiments of the present invention has been presented for the purposes of illustration and description. The foregoing description is not intended to be exhaustive or to limit the present invention to the examples disclosed herein. In some instances, features of the present invention can be employed without a corresponding use of other features as set forth. Many modifications, substitutions, and variations are possible in light of the above teachings, without departing from the scope of the present invention.

What is claimed is:

1. A circuit comprising a clock routing network, the clock routing network comprising:
   a first clock path that routes a first clock signal to sub-circuits in the circuit, wherein the first clock path comprises first buffers that buffer the first clock signal at the sub-circuits and first conductors in a first conductive layer of the circuit that transmit the first clock signal; and
   a second clock path that routes a second clock signal to the sub-circuits and that comprises second buffers that buffer the second clock signal at the sub-circuits, second conductors in the first conductive layer that transmit the second clock signal, and third conductors in a second conductive layer of the circuit, wherein the second clock signal is routed through the third conductors at first overlaps between the first clock path and the second clock path.

2. The circuit defined in claim 1 wherein the first clock path routes the first clock signal to each of the first buffers in serial, the second clock path routes the second clock signal to each of the second buffers in serial, and each of the first overlaps is between the second buffers in the second clock path.

3. The circuit defined in claim 1 wherein the first clock path further comprises fourth conductors in the second conductive layer of the circuit, wherein the first clock signal is routed from the first conductors to the fourth conductors at second overlaps between the first clock path and the second clock path.

4. The circuit defined in claim 1 wherein the sub-circuits are programmable logic blocks, and the circuit is a field programmable gate array.

5. The circuit defined in claim 1 wherein the sub-circuits are data channels that receive and process data signals, and the first and the second clock paths route the first and the second clock signals to at least eight data channels.

6. The circuit defined in claim 1 wherein the second clock path routes the second clock signal from one of the second conductors to one of the third conductors and then to another one of the second conductors at each of the first overlaps between the first clock path and the second clock path.

7. The circuit defined in claim 1 further comprising:
   a third clock path that routes a third clock signal to the sub-circuits in the circuit, wherein the third clock path comprises third buffers that buffer the third clock signal at the sub-circuits, fourth conductors in the first conductive layer that transmit the third clock signal, and fifth conductors in a conductive layer of the circuit other than the first conductive layer, wherein the third clock signal is routed from the fourth conductors to the fifth conductors at second overlaps between the third clock path and at least one of the other clock paths.

8. The circuit defined in claim 7 further comprising:
   a fourth clock path that routes a fourth clock signal to the sub-circuits in the circuit, wherein the fourth clock path comprises fourth buffers that buffer the fourth clock signal at the sub-circuits, sixth conductors in the first conductive layer that transmit the fourth clock signal, and seventh conductors in a conductive layer of the circuit other than the first conductive layer, wherein the fourth clock signal is routed from the sixth conductors to the seventh conductors at third overlaps between the fourth clock path and at least one of the other clock paths.

9. The circuit defined in claim 8 further comprising:
   a fifth clock path that routes a fifth clock signal to the sub-circuits in the circuit, wherein the fifth clock path comprises fifth buffers that buffer the fifth clock signal at the sub-circuits, eighth conductors in the first conductive layer that transmit the fifth clock signal, and ninth conductors in a conductive layer of the circuit other than the first conductive layer, wherein the fifth clock signal is routed from one of the eighth conductors to one of the ninth conductors and then to another one of the eighth conductors at each of fourth overlaps between the fifth clock path and at least one of the other clock paths; and
   a sixth clock path that routes a sixth clock signal to the sub-circuits in the circuit, wherein the sixth clock path comprises sixth buffers that buffer the sixth clock signal at the sub-circuits, tenth conductors in the first conductive layer that transmit the sixth clock signal, and eleventh conductors in a conductive layer of the circuit other than the first conductive layer, wherein the sixth clock signal is routed from one of the tenth conductors to one of the eleventh conductors and then to another one of the tenth conductors at each of fifth overlaps between the sixth clock path and at least one of the other clock paths.

10. The circuit defined in claim 9 further comprising:
    a seventh clock path that routes a seventh clock signal to the sub-circuits in the circuit, wherein the seventh clock path comprises seventh buffers that buffer the seventh clock signal at the sub-circuits, twelfth conductors in the first conductive layer that transmit the seventh clock signal, and thirteenth conductors in a conductive layer of the circuit other than the first conductive layer, wherein the seventh clock signal is routed from one of the twelfth conductors to one of the thirteenth conductors and then to another one of the twelfth conductors at each of sixth overlaps between the seventh clock path and at least one of the other clock paths; and
    an eighth clock path that routes an eighth clock signal to the sub-circuits in the circuit, wherein the eighth clock path comprises eighth buffers that buffer the eighth clock signal at the sub-circuits, fourteenth conductors in the first conductive layer that transmit the eighth clock signal, and fifteenth conductors in a conductive layer of the circuit other than the first conductive layer, wherein the eighth clock signal is routed from one of the fourteenth conductors to one of the fifteenth conductors and then to another one of the fourteenth conductors at each of seventh overlaps between the eighth clock path and at least one of the other clock paths.

11. A clock routing network on an integrated circuit comprising:
    a first clock path that routes a first clock signal through first conductors to clock driven circuits on the integrated circuit, wherein the first clock path comprises first buffers, and each of the first buffers drives the first clock signal to one of the clock driven circuits; and
    a second clock path that routes a second clock signal through second and third conductors to the clock driven circuits, wherein the second clock path comprises second buffers, each of the second buffers drives the second clock signal to one of the clock driven circuits, the first and the second conductors are in a first conductive layer of the integrated circuit, and the third conductors are in a second conductive layer of the integrated circuit, and
    wherein the second clock path transmits the second clock signal to the clock driven circuits on both sides of the first clock path by routing the second clock signal through the third conductors at multiple crossovers with the first clock path.

12. The clock routing network defined in claim 11 further comprising:
a third clock path that routes a third clock signal through fourth and fifth conductors to the clock driven circuits, wherein the third clock path comprises third buffers, each of the third buffers drives the third clock signal to one of the clock driven circuits, the fourth conductors are in the first conductive layer, the fifth conductors are in a conductive layer of the integrated circuit other than the first conductive layer, and the third clock path transmits the third clock signal to the clock driven circuits on both sides of the first clock path by routing the third clock signal through the fifth conductors at multiple crossovers with the first clock path.

13. The clock routing network defined in claim 12 further comprising:
a fourth clock path that routes a fourth clock signal through sixth and seventh conductors to the clock driven circuits, wherein the fourth clock path comprises fourth buffers, each of the fourth buffers drives the fourth clock signal to one of the clock driven circuits, the sixth conductors are in the first conductive layer, the seventh conductors are in a conductive layer of the integrated circuit other than the first conductive layer, and the fourth clock path transmits the fourth clock signal to the clock driven circuits on both sides of the second clock path by routing the fourth clock signal through the seventh conductors at multiple crossovers with the second clock path.

14. The clock routing network defined in claim 13 further comprising:
a fifth clock path that routes a fifth clock signal through eighth and ninth conductors to the clock driven circuits, wherein the fifth clock path comprises fifth buffers, each of the fifth buffers drives the fifth clock signal to one of the clock driven circuits, the eighth conductors are in the first conductive layer, the ninth conductors are in a conductive layer of the integrated circuit other than the first conductive layer, and the fifth clock path transmits the fifth clock signal to the clock driven circuits on both sides of the first clock path by routing the fifth clock signal from the eighth conductors to the ninth conductors at each of a plurality of crossovers with the first clock path.

15. The clock routing network defined in claim 11 wherein the first clock path routes the first clock signal to each of the first buffers in serial, the second clock path routes the second clock signal to each of the second buffers in serial, and each of the crossovers are between the second buffers in the second clock path.

16. The clock routing network defined in claim 11 wherein the second clock path routes the second clock signal from one of the second conductors to one of the third conductors and then to another one of the second conductors at each of the crossovers with the first clock path.

17. A method for distributing a clock signal to sub-circuits in a circuit through a clock routing network, the method comprising:
routing a first clock signal to the sub-circuits in the circuit through a first clock path using first buffers that buffer the first clock signal at the sub-circuits and first conductors in a first conductive layer of the circuit that transmit the first clock signal between the sub-circuits; and
routing a second clock signal to the sub-circuits through a second clock path using second buffers that buffer the second clock signal at the sub-circuits, second conductors in the first conductive layer that transmit the second clock signal between the sub-circuits, and third conductors in a second conductive layer of the circuit, wherein the second clock signal is routed from the second conductors to the third conductors at first overlaps between the first clock path and the second clock path.

18. The method defined in claim 17 wherein routing the first clock signal to the sub-circuits in the circuit through the first clock path further comprises routing the first clock signal to each of the first buffers in serial, and
wherein routing the second clock signal to the sub-circuits through the second clock path further comprises routing the second clock signal to each of the second buffers in serial, and each of the first overlaps is between the second buffers in the second clock path.

19. The method defined in claim 17 further comprising:
routing a third clock signal to the sub-circuits through a third clock path using third buffers that buffer the third clock signal at the sub-circuits, fourth conductors in the first conductive layer that transmit the third clock signal between the sub-circuits, and fifth conductors in conductive layer of the circuit other than the first conductive layer, wherein the third clock signal is routed from the fourth conductors to the fifth conductors and then to the fourth conductors at second overlaps between the third clock path and at least one of the other clock paths.

20. The method defined in claim 19 further comprising:
routing a fourth clock signal to the sub-circuits through a fourth clock path using fourth buffers that buffer the fourth clock signal at the sub-circuits, sixth conductors in the first conductive layer that transmit the fourth clock signal between the sub-circuits, and seventh conductors in a conductive layer of the circuit other than the first conductive layer, wherein the fourth clock signal is routed from the sixth conductors to the seventh conductors and then to the sixth conductors at third overlaps between the fourth clock path and at least one of the other clock paths.

* * * * *